US010499575B2

(12) United States Patent
Stoltzfus et al.

(10) Patent No.: US 10,499,575 B2
(45) Date of Patent: Dec. 10, 2019

(54) MODULAR AEROPONIC GROWING COLUMN AND SYSTEM

(71) Applicant: Aero Development Corp., Wilmington, DE (US)

(72) Inventors: Samuel A. Stoltzfus, Gap, PA (US); Stephen F. Beiler, Quarryville, PA (US); Conrad F. Fendler, Malvern, PA (US)

(73) Assignee: Aero Development Corp., Wilmington, DE (US)

( * ) Notice: Subject to any disclaimer, the term of this patent is extended or adjusted under 35 U.S.C. 154(b) by 793 days.

(21) Appl. No.: 14/720,081

(22) Filed: May 22, 2015

(65) Prior Publication Data

US 2015/0334930 A1    Nov. 26, 2015

Related U.S. Application Data

(60) Provisional application No. 62/002,149, filed on May 22, 2014.

(51) Int. Cl.
*A01G 31/06* (2006.01)
*A01G 9/02* (2018.01)

(52) U.S. Cl.
CPC .................................... *A01G 31/06* (2013.01)

(58) Field of Classification Search
CPC ......... A01G 31/02; A01G 31/06; A01G 9/022
USPC ....................................................... 47/62 A
See application file for complete search history.

(56) References Cited

U.S. PATENT DOCUMENTS

| | | | | |
|---|---|---|---|---|
| 4,161,085 A | * | 7/1979 | Moffett, Jr. ............ | A01G 9/022 47/67 |
| 4,216,617 A | * | 8/1980 | Schmidt ................. | A01G 31/06 47/62 A |
| 4,295,296 A | * | 10/1981 | Kinghorn ............... | A01G 9/025 47/82 |
| 4,622,777 A | * | 11/1986 | Greene, Jr. ............ | A01G 9/022 47/67 |
| 4,986,027 A | * | 1/1991 | Harvey .................. | A01G 9/022 47/59 R |
| 5,031,359 A | * | 7/1991 | Moffett, Jr. ............ | A01G 9/022 47/82 |
| 5,251,399 A | * | 10/1993 | Rasmussen ............ | A01G 9/023 211/88.03 |
| 5,265,376 A | | 11/1993 | Less | |

(Continued)

FOREIGN PATENT DOCUMENTS

| | | | | |
|---|---|---|---|---|
| CA | 2448782 A1 | * | 2/2005 | ............. A01G 31/02 |
| CA | 2947608 A1 | * | 11/2015 | ............. A01G 31/02 |

(Continued)

*Primary Examiner* — Magdalena Topolski
*Assistant Examiner* — Morgan T Barlow
(74) *Attorney, Agent, or Firm* — Barley Snyder

(57) ABSTRACT

A modular aeroponic growing column has an elongated first body, a fluid receiving cap, a fluid draining base cap, and a plurality of growing receptacles. The elongated first body includes a fluid receiving end, an opposite fluid draining end, an interior receiving space extending between the fluid receiving end and the fluid draining end, and a plurality of growing receptacle receiving openings positioned on the first body. The plurality of growing receptacles is positioned in the growing receptacle receiving openings.

26 Claims, 13 Drawing Sheets

(56) References Cited

U.S. PATENT DOCUMENTS

| | | | | |
|---|---|---|---|---|
| 5,276,997 A * | 1/1994 | Swearengin | A01G 9/022 | 47/48.5 |
| 5,363,594 A * | 11/1994 | Davis | A01G 9/022 | 47/82 |
| 5,533,302 A | 7/1996 | Lynch et al. | | |
| 5,555,676 A * | 9/1996 | Lund | A01G 9/022 | 47/82 |
| 6,178,692 B1 | 1/2001 | Graven | | |
| 6,408,570 B1 * | 6/2002 | Shih | A01G 31/02 | 47/79 |
| 7,055,282 B2 * | 6/2006 | Bryan, III | A01G 31/06 | 47/62 R |
| 7,516,574 B2 * | 4/2009 | Gottlieb | A01G 9/023 | 47/62 R |
| 8,181,391 B1 * | 5/2012 | Giacomantonio | A01G 9/025 | 47/59 R |
| 8,225,549 B2 | 7/2012 | Simmons | | |
| 8,365,466 B1 * | 2/2013 | Storey | A01G 31/06 | 47/62 C |
| 8,505,238 B2 | 8/2013 | Luebbers et al. | | |
| 8,966,815 B1 * | 3/2015 | Smiles | A01G 9/022 | 47/39 |
| 9,374,952 B1 * | 6/2016 | Cross | A01G 31/02 | |
| 2003/0089037 A1 * | 5/2003 | Ware | A01G 31/02 | 47/83 |
| 2006/0156624 A1 * | 7/2006 | Roy | A01G 31/02 | 47/62 R |
| 2011/0061297 A1 * | 3/2011 | Simmons | A01G 31/02 | 47/62 A |
| 2012/0297679 A1 * | 11/2012 | Busch | A01G 9/022 | 47/62 R |
| 2013/0118074 A1 * | 5/2013 | Fulbrook | A01G 9/025 | 47/62 N |
| 2014/0000162 A1 | 1/2014 | Blank | | |
| 2014/0000163 A1 * | 1/2014 | Lin | A01G 31/02 | 47/62 R |
| 2014/0130414 A1 * | 5/2014 | Storey | A01G 31/06 | 47/62 A |
| 2014/0290137 A1 * | 10/2014 | Nagels | A01G 31/06 | 47/62 R |
| 2015/0223418 A1 * | 8/2015 | Collins | A01G 31/02 | 47/62 R |
| 2016/0029581 A1 * | 2/2016 | Martin | A01G 31/06 | 47/62 A |
| 2016/0050856 A1 * | 2/2016 | Shah | A01G 9/025 | 47/66.1 |
| 2016/0050863 A1 * | 2/2016 | Graber | A01G 31/02 | 47/62 R |
| 2016/0120141 A1 * | 5/2016 | Stolzfus | A01G 31/06 | 47/62 A |
| 2016/0135394 A1 * | 5/2016 | Wagner | A01G 31/02 | 47/62 R |
| 2016/0135398 A1 * | 5/2016 | Mathieu | A01G 31/06 | 47/62 R |
| 2017/0055473 A1 * | 3/2017 | Baker | A01G 31/06 | |
| 2017/0105372 A1 * | 4/2017 | Bryan | A01G 31/02 | |
| 2017/0325427 A1 * | 11/2017 | Straight | A01K 61/95 | |
| 2017/0339841 A1 * | 11/2017 | Monasterio | A01G 9/0293 | |
| 2017/0339842 A1 * | 11/2017 | Weisel | A01G 9/025 | |
| 2018/0000029 A1 * | 1/2018 | Martin | A01G 31/06 | |
| 2018/0014486 A1 * | 1/2018 | Creechley | A01G 2/20 | |
| 2018/0064037 A1 * | 3/2018 | Tyink | A01G 7/045 | |
| 2018/0199526 A1 * | 7/2018 | Guo | A01G 9/047 | |
| 2018/0213734 A1 * | 8/2018 | Smith | A01G 24/00 | |
| 2018/0263192 A1 * | 9/2018 | Irwin | A01G 9/022 | |

FOREIGN PATENT DOCUMENTS

| | | | | |
|---|---|---|---|---|
| CA | 2956952 A1 * | 2/2016 | | A01G 7/045 |
| CA | 2966344 A1 * | 5/2016 | | A01G 9/047 |
| CA | 2982234 A1 * | 10/2016 | | A01G 9/023 |
| CA | 2956654 A1 * | 4/2018 | | A01G 9/023 |
| DE | 1757458 A1 * | 4/1971 | | A01G 9/022 |
| DE | 4420392 A1 * | 12/1995 | | A01G 31/02 |
| DE | 202015100160 U1 * | 4/2016 | | A01G 9/025 |
| EP | 3251499 A1 * | 12/2017 | | A01G 31/02 |
| FR | 1560632 A * | 3/1969 | | A01G 31/06 |
| FR | 2255842 A1 * | 7/1975 | | A01G 9/022 |
| FR | 2966323 A1 * | 4/2012 | | A01G 9/022 |
| FR | 2955736 B1 * | 3/2013 | | A01G 9/025 |
| FR | 3000872 A1 * | 7/2014 | | A01G 9/022 |
| FR | 3018666 B1 * | 5/2016 | | A01C 1/02 |
| GB | 2532467 A * | 5/2016 | | A01G 9/022 |
| JP | 2011125260 A * | 6/2011 | | A01G 9/022 |
| JP | 2014003948 A * | 1/2014 | | A01G 31/06 |
| JP | 5495198 B1 * | 5/2014 | | A01G 9/024 |
| JP | 5578605 B2 * | 8/2014 | | A01G 9/022 |
| JP | 2015000002 A * | 1/2015 | | A01G 9/024 |
| JP | 2018086004 A * | 6/2018 | | A01G 31/02 |
| RU | 2163755 C1 * | 3/2001 | | A01G 31/02 |
| WO | WO-2011145619 A1 * | 11/2011 | | A01G 31/02 |
| WO | WO-2015196559 A1 * | 12/2015 | | A01G 31/02 |
| WO | WO-2016081711 A2 * | 5/2016 | | A01G 9/022 |
| WO | WO-2016117779 A1 * | 7/2016 | | A01G 31/06 |
| WO | WO-2018035314 A1 * | 2/2018 | | A01G 27/00 |
| WO | WO-2018065910 A1 * | 4/2018 | | A01G 31/06 |

* cited by examiner

MODULAR AEROPONIC GROWING COLUMN AND SYSTEM

CROSS-REFERENCE TO RELATED APPLICATION

This application claims priority to U.S. Provisional Application No. 62/002,149, filed May 22, 2014.

FIELD OF THE INVENTION

The invention is generally related to aeroponics, and, more specifically, to a modular aeroponic growing column and system.

BACKGROUND

Aeroponics are generally soil-less growing systems that involve growing plants with their roots suspended in a chamber. The roots are periodically or continuously subjected to a fine mist or spray of liquefied nutrients.

Conventional aeroponic systems are generally complex in design, expensive to manufacture, and lack of scalability. Such disadvantages have precluded widespread commercial application of aeroponic systems.

SUMMARY

A modular aeroponic growing column has an elongated first body, a fluid receiving cap, a fluid draining base cap, and a plurality of growing receptacles. The elongated first body includes a fluid receiving end, an opposite fluid draining end, an interior receiving space extending between the fluid receiving end and the fluid draining end, and a plurality of growing receptacle receiving openings positioned on the first body. The plurality of growing receptacles is positioned in the growing receptacle receiving openings.

BRIEF DESCRIPTION OF THE DRAWINGS

The invention will now be described by way of example, with reference to the accompanying Figures, of which.

DETAILED DESCRIPTION OF THE PREFERRED EMBODIMENTS

Figure 1:
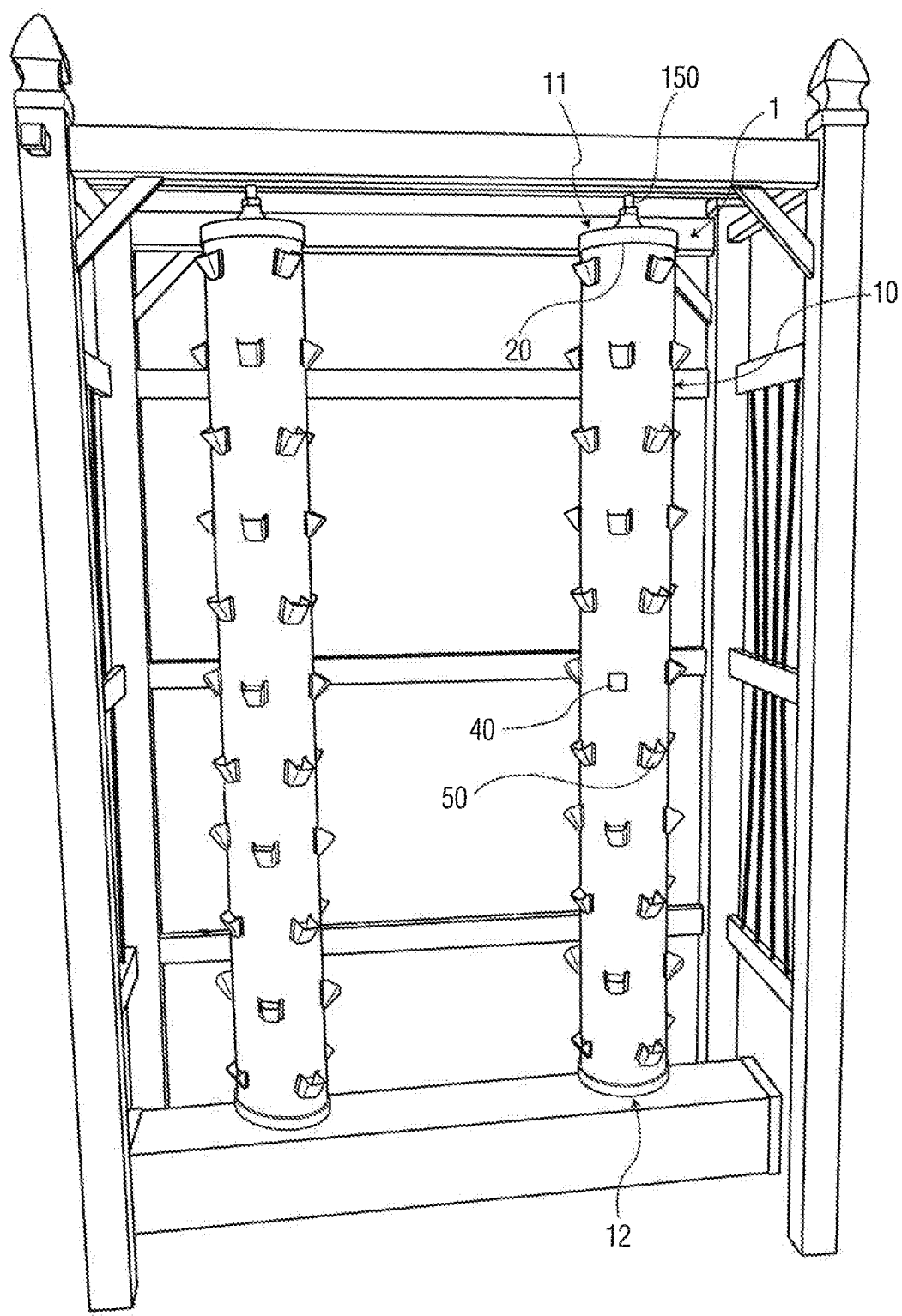
FIG. 1 is a perspective view of an aeroponic growth column.

An embodiment of an aeroponic growing column 1 is disclosed having a first body 10 and a growing receptacle 50.

The first body 10 is elongated and has an exterior surface and an interior surface, a fluid receiving end 11, and a fluid draining end 12 distal to the fluid receiving end 11. The shape of the first body 10 may be cylindrical, square, rectangular, oval or any other shape known to those of ordinary skill in the art. In an embodiment shown in FIG. 1, the first body 10 is cylindrical. In an embodiment shown in FIG. 3, the first body 10 is square.

The first body 10 is made of a plastic material. In an embodiment, the plastic material may be polyethylene, polypropolene, polyvinylchloride, or acrylonitrile butadinene styrene.

In an embodiment, the first body 10 includes an interior receiving cavity (not shown), a fluid receiving cap 20, a base cap 30, a plurality of growing receptacle receiving openings 40, and a plurality of growing receptacles 50.

The interior receiving cavity extends the length of the interior of the first body 10. In an embodiment, the interior receiving cavity is hollow. In another embodiment, the interior receiving cavity may include internal support structures.

The fluid receiving cap 20 is positioned on the fluid receiving end 11 of the first body 10 and includes a second body 20a, 20b, a flange 26, and a sprayer receiving hole 22.

Figure 2:
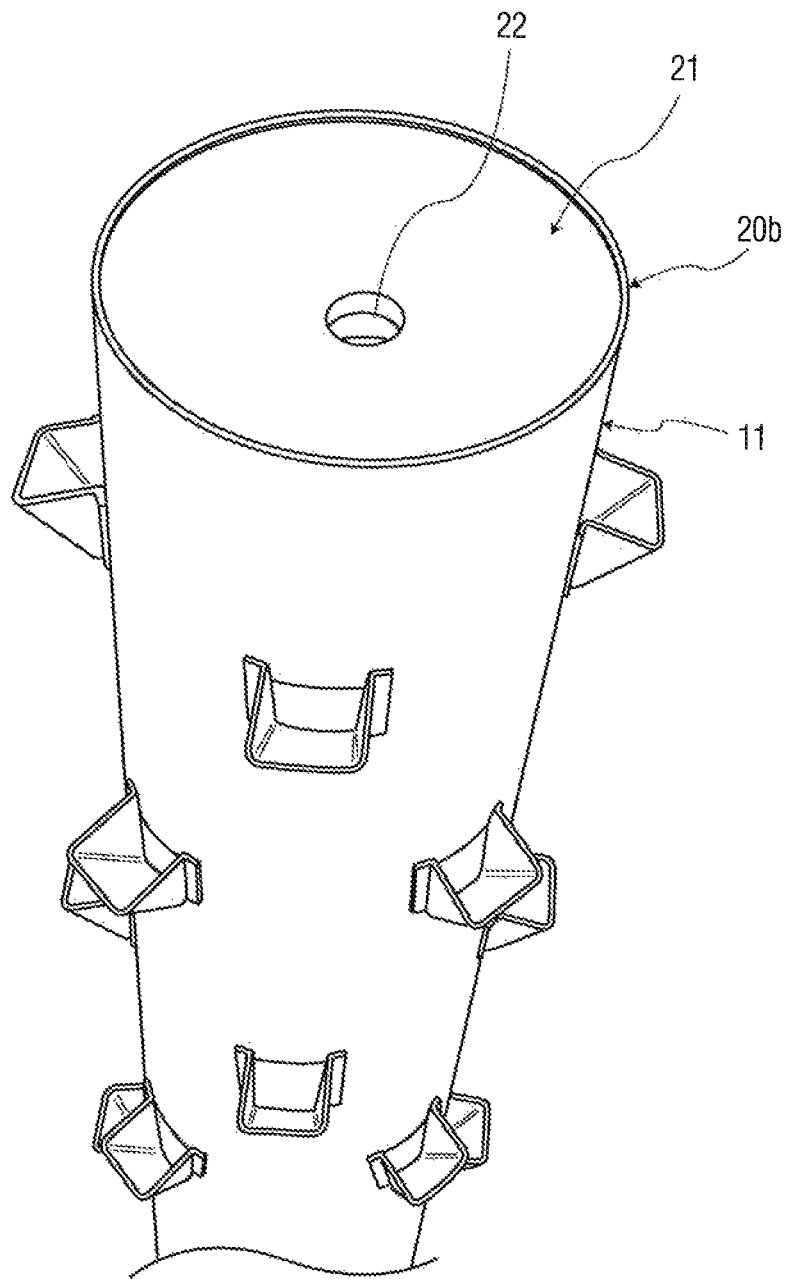
FIG. 2 is a perspective view of a fluid receiving end of the aeroponic growth column.

In an embodiment shown in FIG. 2, the fluid receiving cap 20 is conical, and includes a conical second body 20b that extends into the interior receiving cavity of the first body 10. The sprayer receiving hole 22 is positioned at an apex of the second body 20b, such that the second body 20b slopes towards the sprayer receiving hole 22.

Figure 4A:
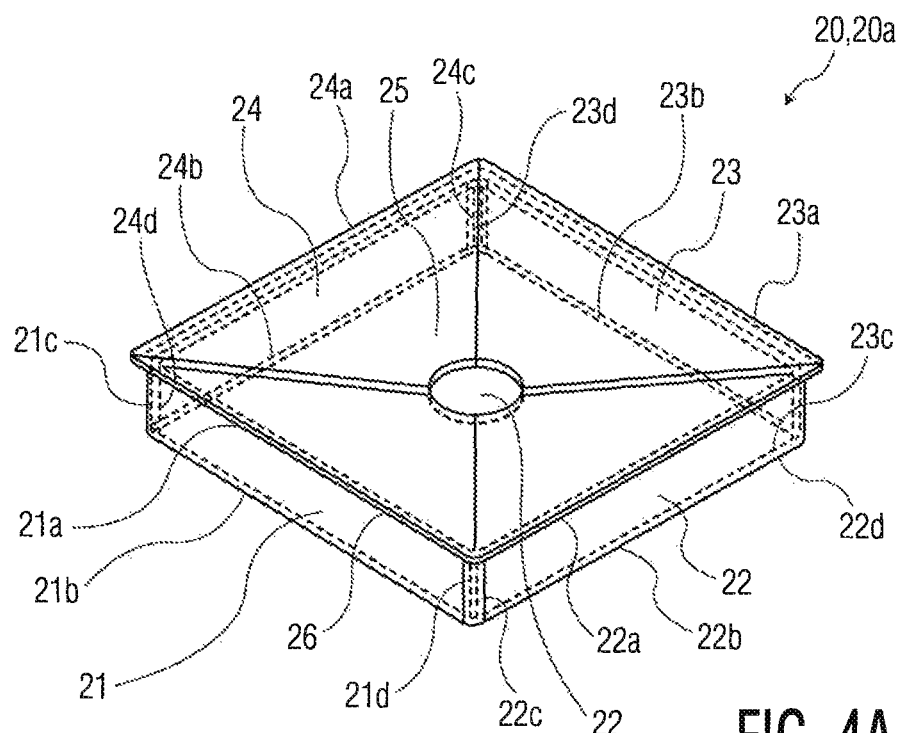
FIG. 4a shows a schematic view of a fluid receiving cap.
Figure 4B:
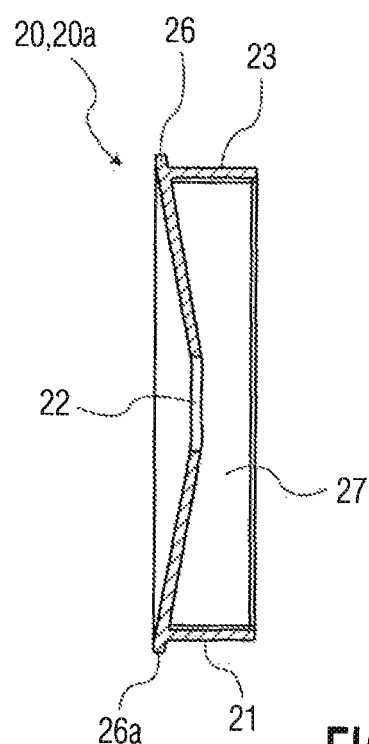
FIG. 4b is a sectional view of the fluid receiving cap.

In the embodiments shown in FIGS. 4a and 4b, the fluid receiving cap 20a is generally square, and has a first sidewall 21, a second sidewall 22, a third sidewall 23, a fourth sidewall 24, and a top wall 25. The first sidewall 21 has a first top edge 21a, an opposing first bottom edge 21b, a first side edge 21c, and an opposing second side edge 21d. The second sidewall 22 has a second top edge 22a, an opposing second bottom edge 22b, a third side edge 22c, and an opposing fourth side edge 22d. The third sidewall 23 has a third top edge 23a, an opposing third bottom edge 23b, a fifth side edge 23c, and an opposing sixth side edge 23d. The fourth sidewall 24 has a fourth top edge 24a, an opposing fourth bottom edge 24b, a seventh side edge 24c, and an opposing eighth side edge 24d. The top wall 25 has a first top wall edge 25a, a second top wall edge 25b, a third top wall edge 25c, and fourth top wall edge 25d.

The first side edge 21c is connected to the eighth side edge 24d, the second side edge 21d is connected to the third side edge 22c, the fourth side edge 22d is connected to the fifth side edge 23c, and the sixth side edge 23d is connected to the seventh side edge 24c. The first top edge 21a is connected to the first top wall edge 25a, the second top edge 22a is connected to the second top wall edge 25b, the third top edge 23a is connected to the third top wall edge 25c, and the fourth top edge 24a is connected to the fourth top wall edge 25d.

Together, the first, second, third, and fourth sidewalls 21,22,23,24 and the top wall 25 form the second body 20a. In an embodiment, the first and third sidewalls 21,23 are approximately equal in length and width, and extend parallel to each other. In another embodiment, the second and fourth sidewalls 22,24 are approximately equal in length and width, and extend parallel to each other. The first and third sidewalls 21,23 extend perpendicular to the second and fourth sidewalls 22,24. An interior receiving cavity 27 is disposed in the interior of the second body 20a.

A distance between an outer surface of the first and third sidewalls 21,23 is less than a diameter of the interior receiving cavity of the aeroponic growing column 1 described above. A distance between an outer surface of the second and fourth sidewalls 22,24 is less than the diameter of the interior receiving cavity of the aeroponic growing column 1 described above.

In the embodiments shown in FIGS. 4a and 4b, the top wall 25 is concave and extends into the interior receiving cavity 27. In an embodiment, the top wall 25 has a concave, cone-like shape. In an embodiment shown in FIG. 12, the top wall 25 has four triangular elements extending inward into the interior receiving cavity 27, where each triangular element sits on a plane that extends obliquely from a plane formed by the first, second, third, and fourth top edges 21a,22a,23a,24a. In another embodiment, the top wall 25 is flat or convex.

The sprayer receiving hole 22 extends from a top surface to a bottom surface of the top wall 25 to form a through-hole. In an embodiment, when the top wall 25 is concave or convex, the sprayer receiving hole 22 is positioned at an apex of the second body 20a,20b such that the second body 20a,20b slopes towards the sprayer receiving hole 22. The slope of the second body 20a,20b creates a funnel that slopes towards the sprayer receiving hole 22 to prevent fluid leakage outside the first body 10. In another embodiment, when the second body 20a,20b is flat, the sprayer receiving hole 22 is positioned at an approximate center of the top wall 25.

The flange 26 is positioned along the top edges 21a,22a, 23a,24a of the sidewalls 21,22,23,24 or along the single sidewall when the sidewall is circular. The diameter of an outer circumferential edge 26a of the flange 26 is equal to a diameter of the fluid receiving end 11 of the first body 10 for the aeroponic growing column 1.

To install the fluid receiving cap 20 on the aeroponic growing column 1, the fluid receiving cap 20 is positioned on the fluid receiving end 11 of the first body 10 such that the second body 20a,20b extends into the interior receiving cavity of the first body 10. The flange 26 rests on the fluid receiving end 11 and the outer circumferential edge 26a is flush with the outer surface of the first body 10.

Figure 3:
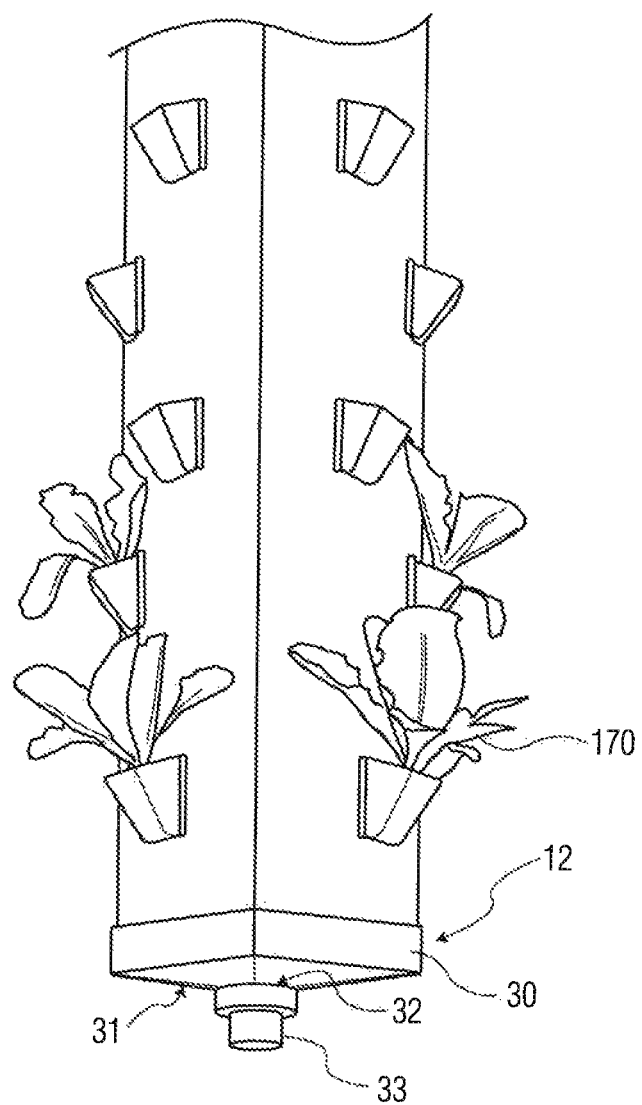
FIG. 3 is a perspective view of a fluid draining end 12 of the aeroponic growth column.

In an embodiment shown in FIG. 3, the base cap 30 is positioned on the fluid draining end 12 of the first body 10 and includes a third body 31, a drain hole 32, and a drain spout 33.

The third body 31 extends outward, away from the fluid draining end 12 of the first body 10. The drain hole 32 is positioned at an apex of the third body 31, such that the third body 31 slopes towards the drain hole 32. The drain spout 33 is connected to the drain hole 32 and extends outward from the drain hole 32.

The plurality of growing receptacle receiving openings 40 are disposed on the exterior of the first body 10. In an embodiment, the growing receptacle receiving openings 40 are through holes that extend from the exterior surface to the interior surface of the first body 10.

Figure 5:
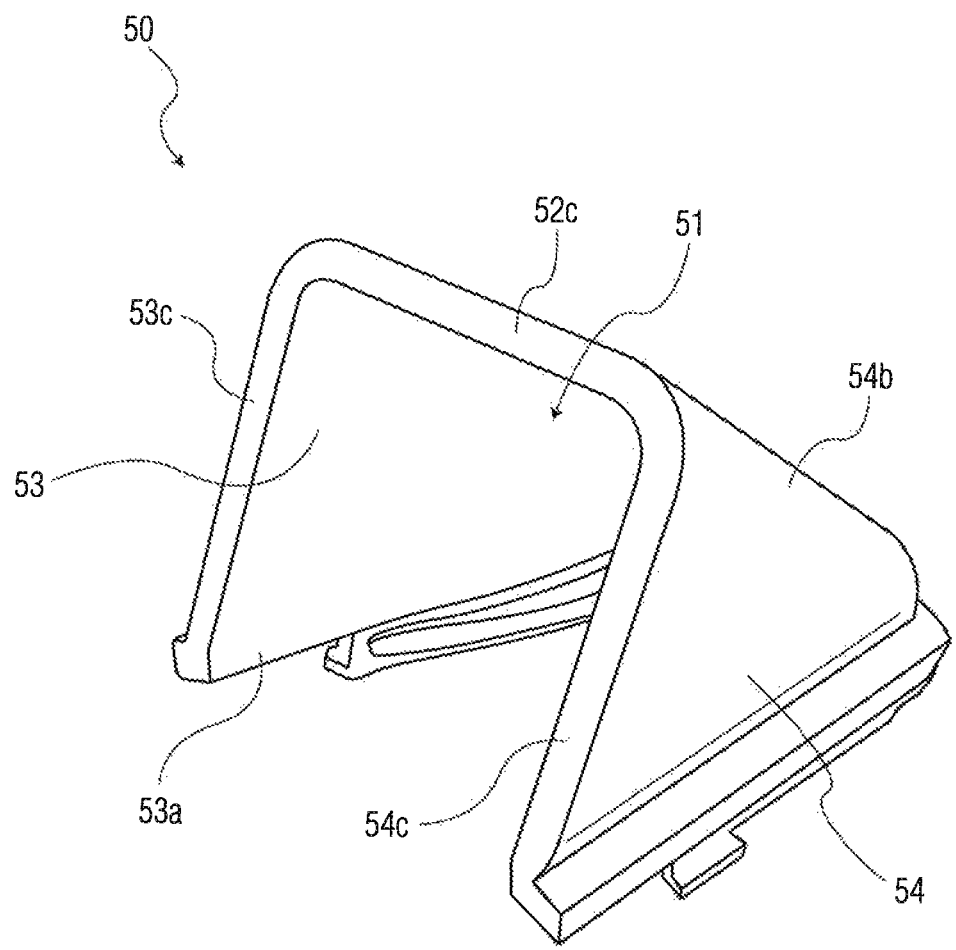
FIG. 5 is a perspective view from an oblique angle of a growth receptacle.
Figure 6:
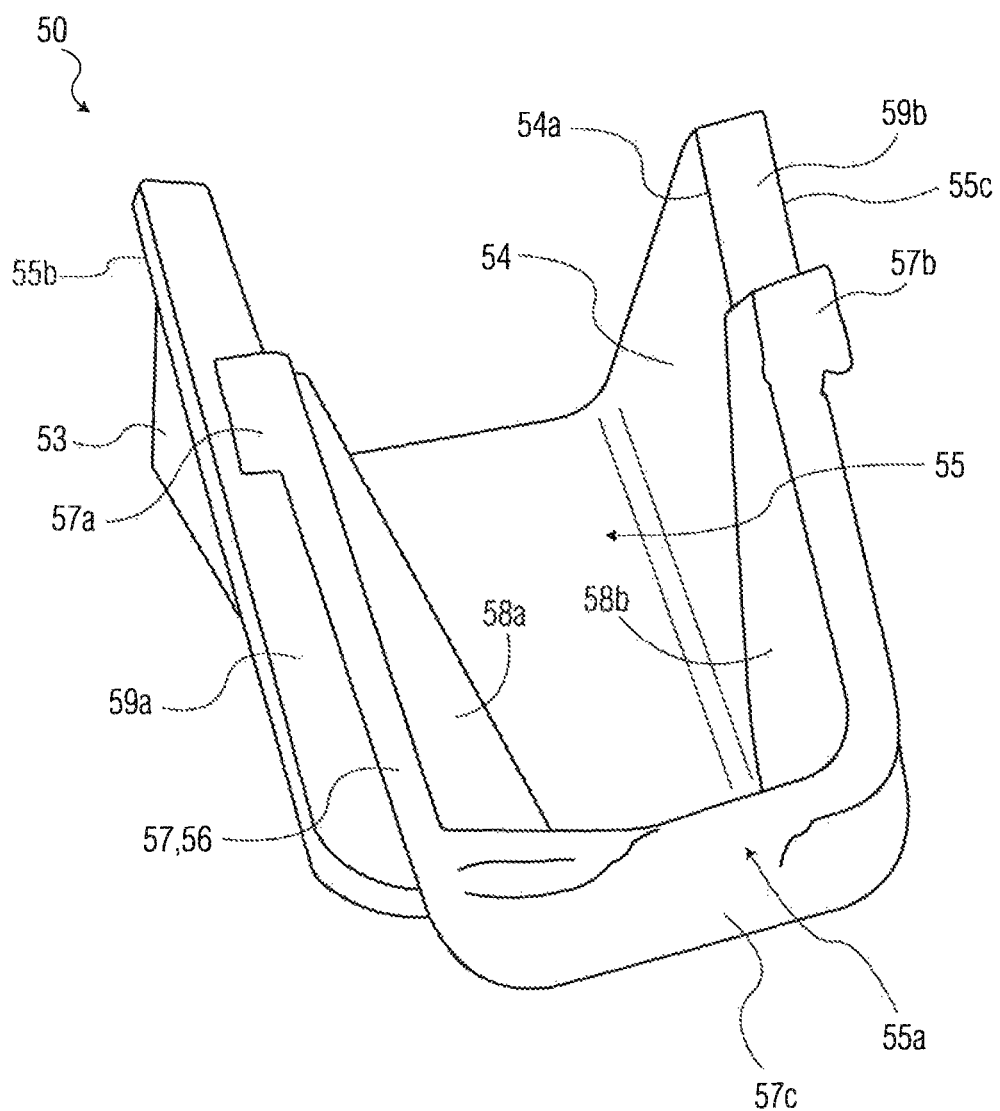
FIG. 6 is a perspective view of a rear of the growth receptacle.
Figure 7:
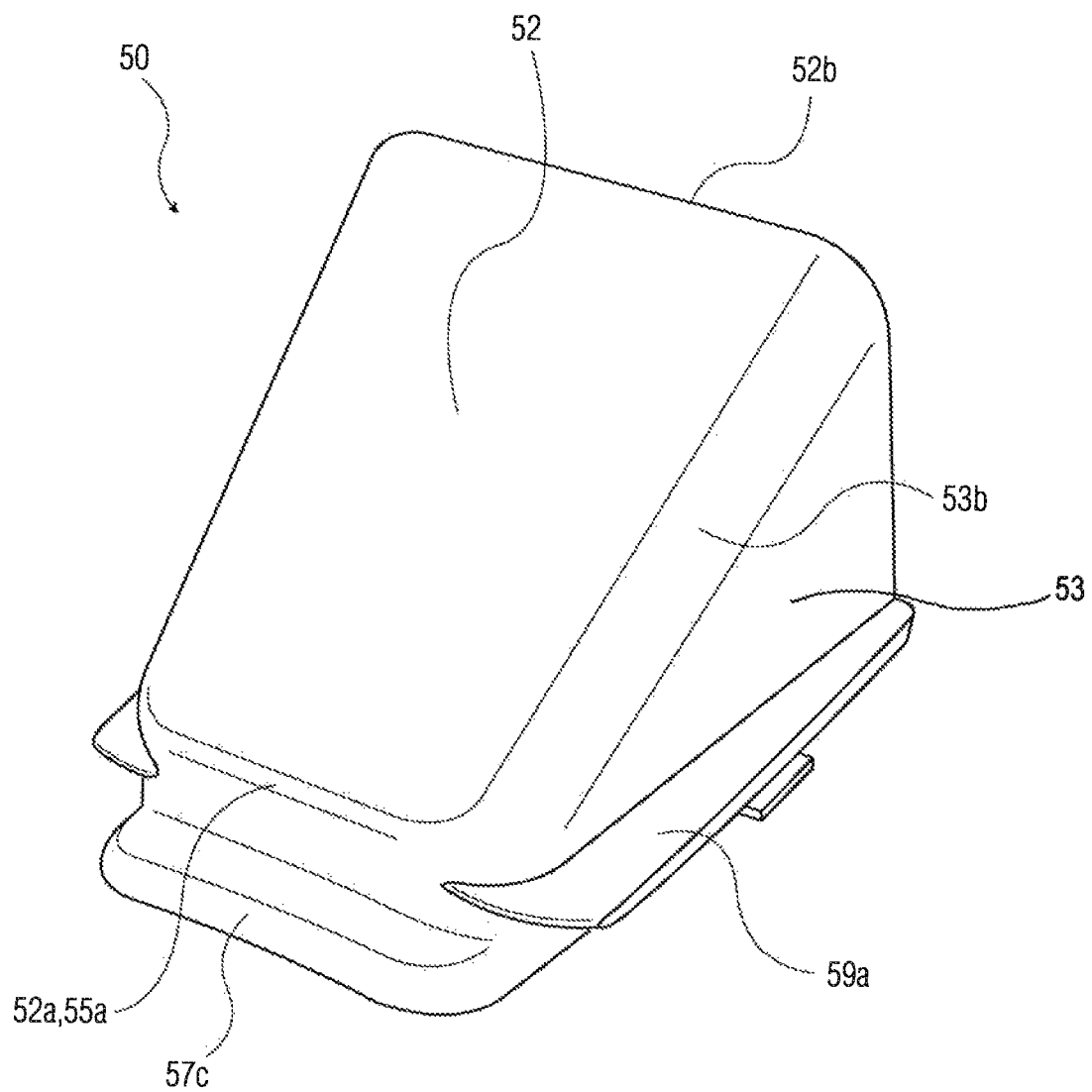
FIG. 7 is a perspective view of a front of the growth receptacle.

As shown in FIGS. 5-7, in an embodiment the plurality of growing receptacles 50 each include a rear opening 55, a top opening 51, a front wall 52, a first sidewall 53, and a second sidewall 54.

The rear opening 55 sits on a first plane, and is positionable over the growing receptacle receiving opening 40.

The front wall 52 has a first end 52a extending from the rear opening 55 to define a base side 55a of the rear opening 55, and a second end 52b spaced apart from the first plane of the rear opening 55 and extending away from the first end 52a such that the front wall 52 extends orthogonally away from the first plane. In an embodiment, the front wall 52 extends orthogonally away from the first plane at an angle of 90 degrees or less. In another embodiment, the front wall 52 extends orthogonally away from the first plane at an angle of 45 degrees or less.

The first sidewall 53 has an approximate triangular shape, and a first rear edge 53a extending along the first plane to define a first side 55b of the rear opening 55, and a first front edge 53b continuously in contact with the front wall 52.

The second sidewall 54 has an approximate triangular shape, and a second rear edge 54a extending along the first plane to define a second side 55c of the rear opening 55 opposite the first side 55b. The second side 55c is space apart from the first side 55b by the base side 55a The second sidewall 54 has a second front edge 54b continuously in contact with the front wall 52. The second sidewall 54 extends parallel to the first sidewall 53 from the first plane, and is spaced apart from the first sidewall 53 by the front wall 52.

The top opening 51 sitting on a second plane defined by a first top edge 53c of first sidewall 53, a second top edge 54c of the second sidewall 54, and a top edge 52c of the front wall 52. In an embodiment, the second plane extends orthogonally away from the first plane.

In an embodiment, the growing receptacles 50 have a flange 59. The flange 59 includes a first flange element 59a positioned along the first rear edge 53a of the first sidewall 53, and a second flange element 59b positioned along the second rear edge 54a of the second sidewall 54. The first and second flange elements 59a, 59b extended outward in opposite directions along a common plane that is parallel with the first plane. In an embodiment, the first and second flange element 59a,59b extend outward in opposite directions along the first plane.

In an embodiment, the growing receptacles 50 are affixed to the column 1 by positioning the rear opening 55 over the growing receptacle receiving openings 40 and contacting the first and second flange elements 59a, 59b to the exterior surface of the first body 10. The growing receptacles 50 can be affixed using an adhesive or cement to form a sealed growing cup.

In an exemplary embodiment, the growing receptacles 50 have a U-shaped protrusion 56 projecting perpendicular to the plane of the rear opening 55, from the base side 55a, first side 55b, and second side 55c. A latching mechanism 57 is positioned on the U-shaped protrusion 56, and includes a first latching protrusion 57a on the first side 55b, a second latching protrusion 57b on the second side 55c, and a camming lip 57c extending from the base side 55a parallel to the first plane of the rear opening 55.

In another exemplary embodiment, the rear opening 55 has an approximate V-shape formed from a first wing 58a positioned proximate to the U-shaped protrusion 56 on the first side 55b, and a second wing 58b positioned proximate to the U-shaped protrusion 56 on the second side 55c. The first wing 58a extends inward from the first sidewall 53, towards the second sidewall 54. The second wing 58b extends inward from the second sidewall 54, towards the first sidewall 53.

In an embodiment, the growing receptacles 50 are affixed to the column 1 by positioning the rear opening 55 over the growing receptacle receiving openings 40, inserting the camming lip 57c into the growing receptacle receiving openings 40 at an angle, tilting the rear opening 55 towards the column 1 to contact the flanges 59a,59b with the exterior surface of the first body 10, and engaging the first and second latch protrusions 57a,57b with the growing receptacle receiving openings 40. In another embodiment, an adhesive or cement is used to further attach the growing receptacles 50 to the first body 10. (not shown)

Figure 14:
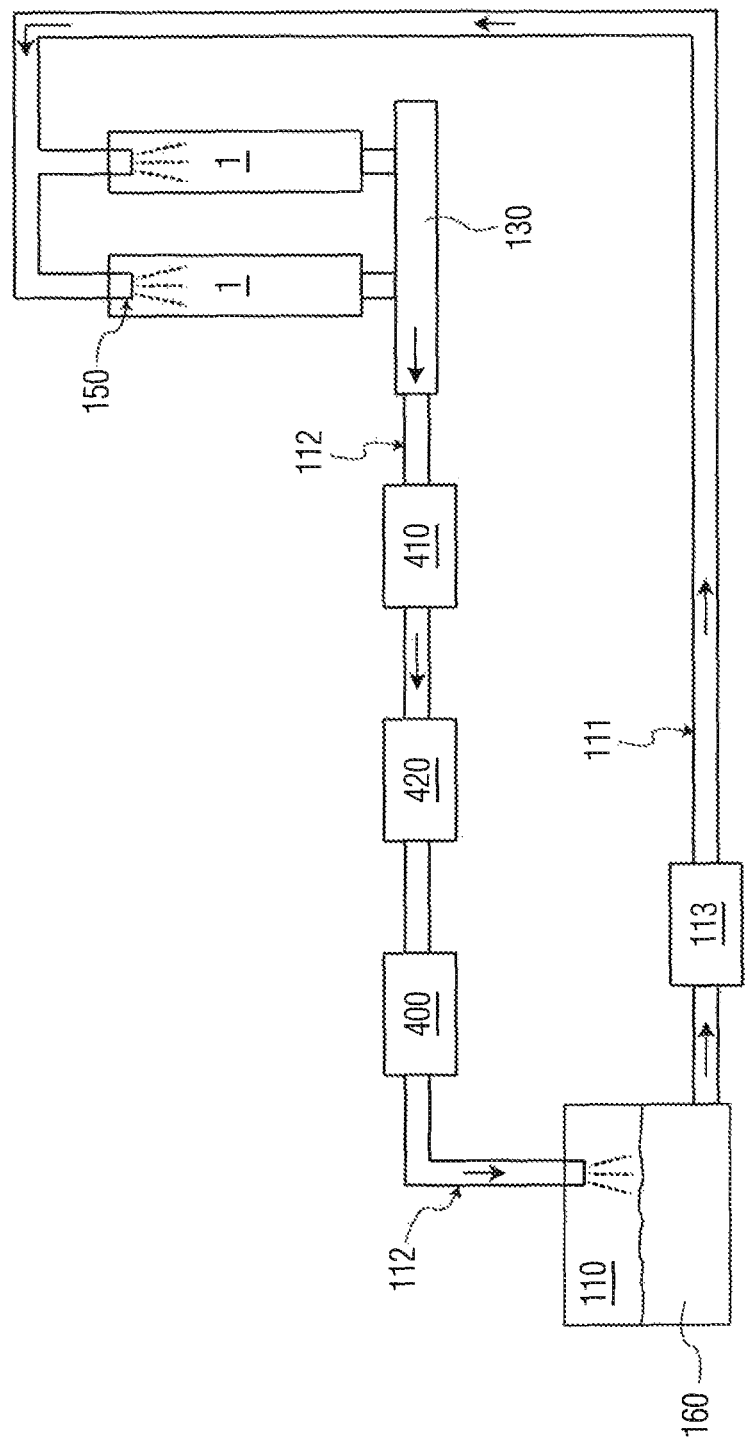
FIG. 14 is a perspective view aeroponic growing column system showing a fluid reservoir and a boiler.

In an embodiment shown in FIG. 14, an aeroponic growing column system 100 has a reservoir 110, a supply conduit 111, a return conduit 112, a pump 113, a fluid draining base 130, a sprayer 150, the column 1, and a nutrient enriched fluid 160. In another embodiment, the aeroponic growing column system 100 further includes a Grotronic meter 410, a Dosatron 400, a fluid heater 420 or a combination thereof.

The reservoir 110 houses the nutrient enriched fluid 160 and has an outlet connected to the supply conduit 111 and an inlet connected to the return conduit 112.

The supply conduit 111 and the return conduit 112 may be pipes, rigid or flexible tubing, or any other conduit know to those of ordinary skill in the art.

The sprayer 150 is connected to a terminating end of the supply conduit 111 and is in fluid communication with the reservoir 110. The sprayer 150 is positioned vertically over the fluid draining base 130.

The pump 113 is coupled to the reservoir 110 and the supply conduit 111 and supplies the nutrient enriched fluid 160 from the reservoir 110 to the sprayer 150 through the supply conduit 111. In an embodiment, a filter (not shown) can be positioned on the supply conduit, between the reservoir and the sprayer 150 to remove impurities from the nutrient enriched fluid 160. A power supply (not shown) is connected to the pump 113.

The fluid draining base 130 is connected to the return conduit 112 and has a drain spout receiving hole 131. Nutrient enriched fluid 160 enters the fluid draining base 130, through the drain spout receiving hole 131, and into the return conduit 112 to flow back into the reservoir 110.

The column 1, as shown in FIGS. 1-3 and described in the above embodiments, is connected to the supply conduit 111 and reservoir 110, through the sprayer 150. The column 1 is connected to the return conduit 112 and reservoir 110 through the fluid draining base 130.

As shown in FIG. 1, the sprayer 150 is positioned in the sprayer receiving hole 22 and extends into the interior receiving cavity of the first body 10 to hold the column 1 in a vertical position. As seen in FIGS. 1, 3, 8 and 9, the drain spout 33 of the base cap 30 has a diameter that is smaller than a diameter of the drain spout receiving hole 131, such that the drain spout 33 is insertable into the fluid draining base 130 through the drain spout receiving hole 131. The base cap 30 of the column 1 rests on, and is supported by the fluid draining base 130.

Since the base cap 30 is supported by the fluid draining base 130, the column 1 can easily be removed or installed into the aeroponic growing column system 100. To install a column 1, the column 1 is first tilted at an angle to the sprayer 150. Then the sprayer 150 is inserted into the sprayer receiving hole 22. Next, the column 1 is brought into a vertical position over the fluid draining base 130. The column 1 is then lowered such that the drain spout 33 is inserted through the drain spout receiving hole 131, into the fluid draining base 130, until the base cap 30 rests on the fluid draining base 130. To remove the column 1, the process is repeated in reverse.

The nutrient enriched fluid 160 is understood to be a fluid that contains nutrients in a solution. The composition of the nutrient enriched fluid 160 is well known to one of ordinary skill in the art for aeroponic or hydroponic systems. In an embodiment, the nutrient enriched fluid 160 includes minerals such as calcium nitrate, iron, monopotassium phosphate, potassium nitrate, magnesium sulfate, ironic earth minerals, or a combination thereof.

The Grotronic meter 410 is an instrument that measures the temperature, conductivity, and pH of a fluid. See FIGS. 14 and 15. In an embodiment, the Grotronic meter 410 measures the temperature, conductivity and pH of the nutrient enriched fluid 160. An example of the Grotronic meter 410 is the meters made by YSI, Inc., although those of ordinary skill in the art would appreciate that other brands of meters may also be used to measure the temperature, conductivity and pH of the nutrient enriched fluid 160. In an embodiment, the Grotronic meter 410 measures the temperature, conductivity, and pH of the nutrient enriched fluid 160 in the reservoir 110.

The Dosatron 400 regulates and controls the concentration of the minerals in the nutrient enriched fluid 160. See FIGS. 14 and 15. An example of the Dosatron 400 is the Dosatron systems made by Dosatron International, Inc., although those of ordinary skill in the art would appreciate that other brands of meters may also be used to regulate and control the concentration of the minerals. The mineral concentrations in the nutrient enriched fluid 160 can be set at pre-determined levels, and the Dosatron 400 will add minerals to the nutrient enriched fluid 160 when the concentration of those minerals fall below the pre-determined levels. In an embodiment, the Dosatron 400 is connected to the Grotronic meter 410, and the pre-determined levels of mineral concentrations are determined by the conductivity and pH levels of the nutrient enriched fluid 160, as measured by the Grotronic meter 410. When the conductivity and/or pH levels of the nutrient enriched fluid 160 detected by the Grotronic meter 410 fall outside the pre-determined levels, the Dosatron 400 injects the deficient minerals to the nutrient enriched fluid 160 to bring the conductivity and/or pH levels back into the pre-determined levels.

In an embodiment, a boiler 420 is connected to a heater conduit 113 connected to a radiant under floor heating system (not shown), and is used to heat the greenhouse to a pre-determined temperature. See FIG. 14. Those skilled in the art will appreciate that the radiant under floor heating system consists of a plurality of pipes and/or radiators through which the hot fluid is circulated by the boiler 420 and conduit 113. Examples of the boiler 420 can be a common water heater or boiler. In an embodiment, the temperature of the greenhouse can be set to a pre-determined level, using known thermostat and control systems to control the heater 420.

The method of operation for the aeroponic growing column system 100 is as follows. The pump 113 pushes the nutrient enriched fluid 160 through the supply conduit 111 from the reservoir 110, upward to the sprayer 150. The sprayer 150 then disperses the nutrient enriched fluid 160 into the interior receiving cavity of the first body 10 of the column 1 as a mist, fog, or spray. The nutrient enriched fluid 160 then travels down the length of the first body 10, from the fluid receiving end 11 to the fluid draining end 12 through the use of gravitational pull. Excess nutrient enriched fluid 160 not used by the growing plants then drains from the column 1 through the drain spout 33 and fluid draining base 130, into the return conduit 112. Once in the return conduit 112, the nutrient enriched fluid 160 flows back to the reservoir 110 to be tested for conductivity, pH, and temperature. If the conductivity, pH, or temperature values are outside the pre-determined levels, the Dosatron 400 will inject the appropriate minerals until the conductivity and pH levels are within the pre-determined levels, and control temperature until the temperature is within the pre-determined level. The nutrient enriched fluid 160 is then reused.

In the embodiments using the filter positioned on the supply conduit, when the pump 113 pushes the nutrient enriched fluid 160 though the supply conduit 111, the nutrient enriched fluid 160 also passes through the filter, and impurities are removed.

Again referring to FIGS. 1-3 and 5-7, the growing receptacle 50 holds a growing plant 170. An upper portion of the plant 170 extends out of growing receptacle 50, through the top opening 51, and is exposed to artificial or natural light. The approximate V-shape of the rear opening 55 of the growing receptacle prevents the plant 170 from falling into the interior receiving cavity of the first body 10. However, the V-shape still allows a root mass on a lower portion of the plant 170 to extend through the rear opening 55 and growing container receiving opening 40, into the interior receiving cavity. The root mass can then be exposed to the nutrient enriched fluid 160 being dispersed by the sprayer 150 from the supply conduit 111. Since the front wall 52 of the growing receptacle 50 extends orthogonally away from the first plane of the rear opening 55, any unused nutrient enriched fluid 160 not absorbed by the exposed root mass will drain away towards the fluid draining end 12 of the first body 10 to be reused.

Figure 8:
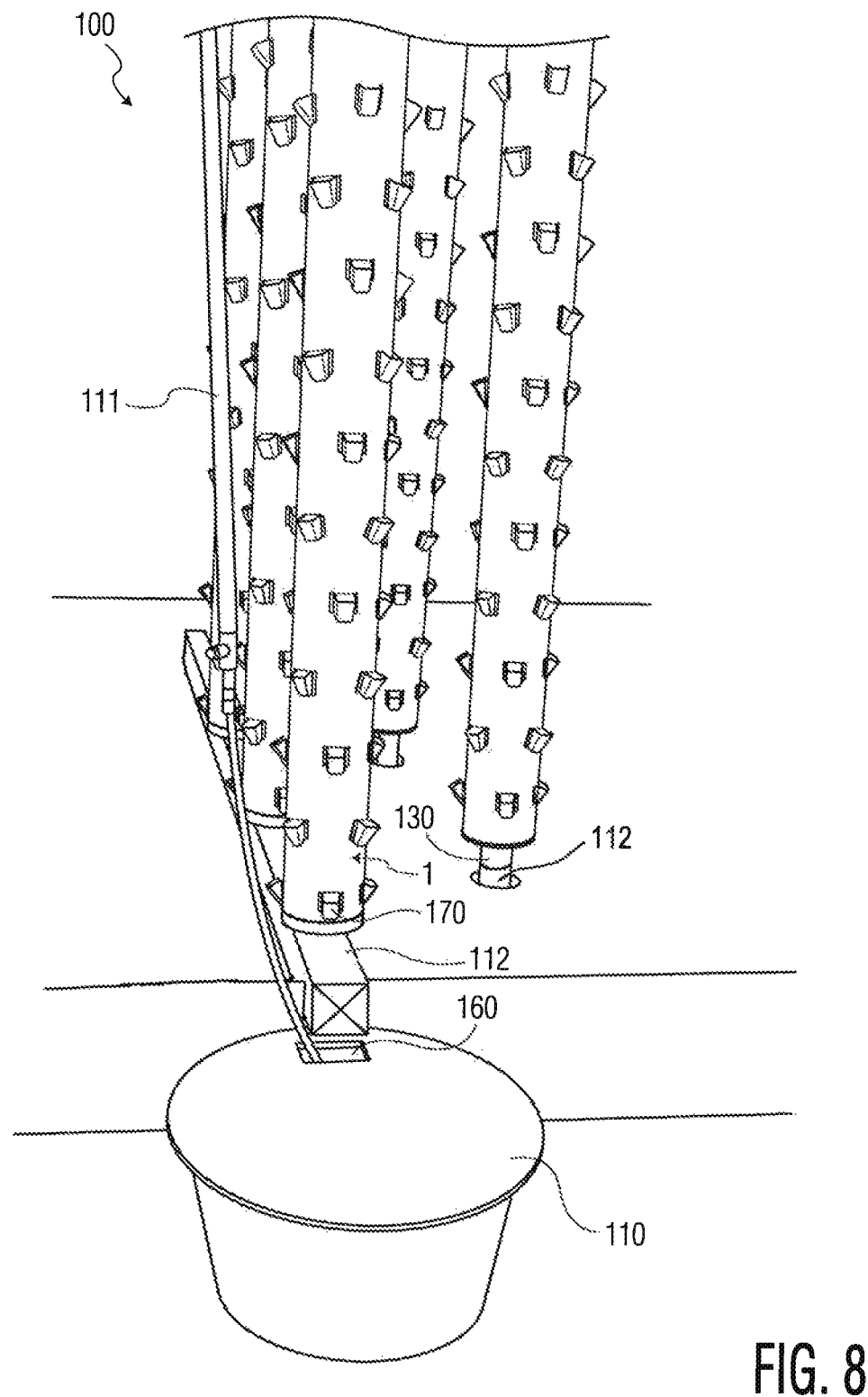
FIG. 8 is a perspective view of an aeroponic growing column system.
Figure 9:
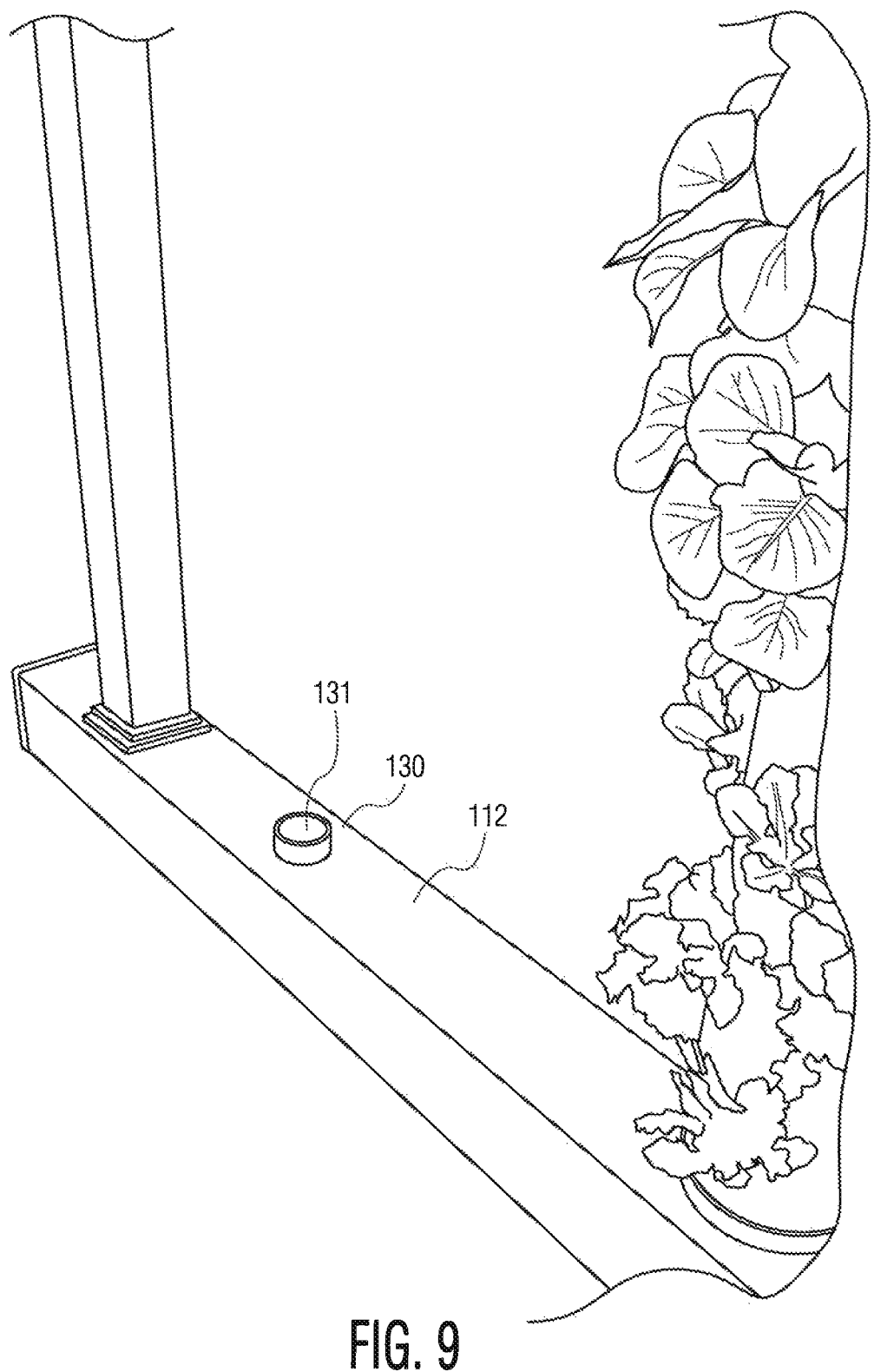
FIG. 9 is a perspective view of a fluid returning base of a return conduit.

In the embodiment shown in FIGS. 1 and 8, the aeroponic growing column system 100, includes a plurality of columns 1, a plurality of fluid draining bases 130, and plurality of sprayers 150. In an embodiment, the plurality of fluid draining bases 130 are connected to the reservoir 110 by a single return conduit 112. In another embodiment, the plurality of fluid draining bases 130 are connected to the reservoir 110 by a plurality of return conduits 112. Similarly, in an embodiment, the plurality of sprayers 150 are connected to the reservoir 110 by a single supply conduit 111. In another embodiment, the plurality of sprayers 150 are connected to the reservoir 110 by a plurality of supply conduits 111.

In another embodiment of the aeroponic growing column 1, the aeroponic growing column 1 further includes a controlled flow reservoir 3. The controlled flow reservoir 3 includes a reservoir body 300, a plurality of fluid dispersing passageways 306, a flange 310 and a top opening 311.

Figure 12:
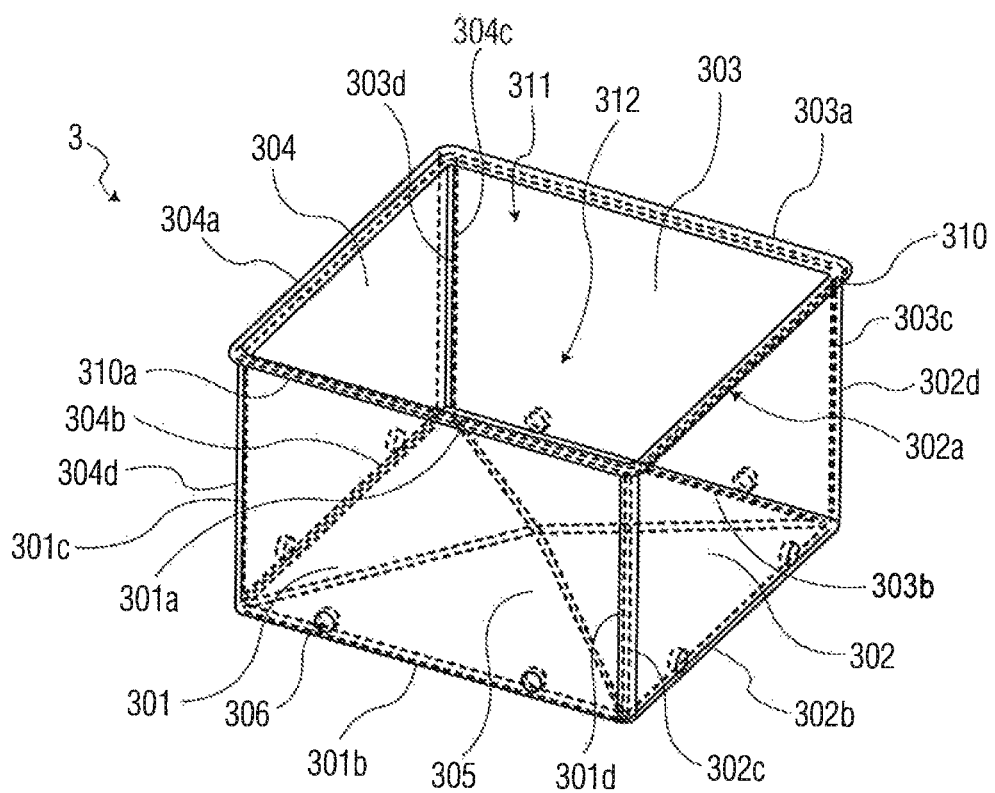
FIG. 12 is a schematic view of a controlled flow reservoir.
Figure 13:
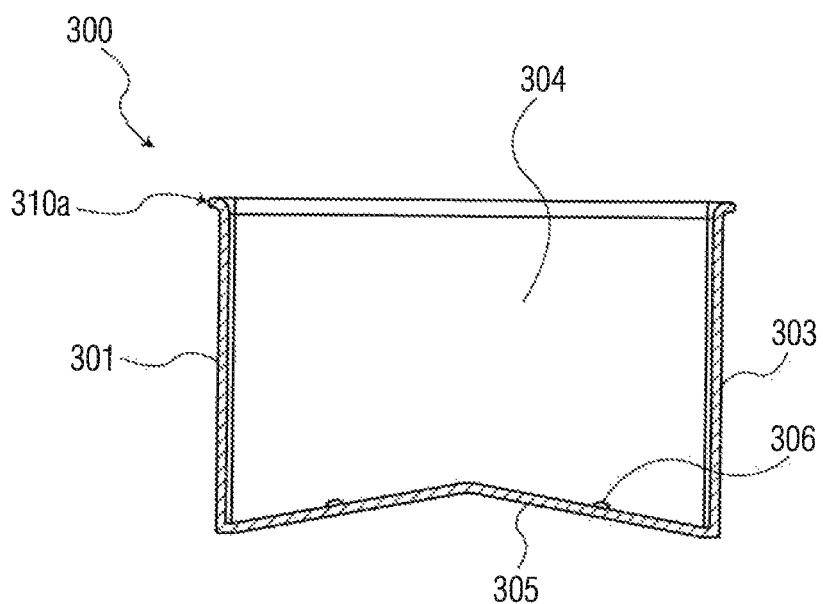
FIG. 13 is a sectional view of the controlled flow reservoir.

In an embodiment shown in FIGS. 12 and 13, the reservoir body 300 has a first sidewall 301, a second sidewall 302, a third sidewall 303, a fourth sidewall 304, and a base wall 305. The first sidewall 301 has a first top edge 301a, an opposing first bottom edge 301b, a first side edge 301c, and an opposing second side edge 301d. The second sidewall 302 has a second top edge 302a, an opposing second bottom edge 302b, a third side edge 302c, and an opposing fourth side edge 302d. The third sidewall 303 has a third top edge 303a, an opposing third bottom edge 303b, a fifth side edge 303c, and an opposing sixth side edge 303d. The fourth sidewall 304 has a fourth top edge 304a, an opposing fourth bottom edge 304b, a seventh side edge 304c, and an opposing eighth side edge 304d. The base wall 305 has a first base edge 305a, a second base edge 305b, a third base edge 305c, and fourth base edge 305d.

The first side edge 301c is connected to the eighth side edge 304d, the second side edge 301d is connected to the third side edge 302c, the fourth side edge 302d is connected to the fifth side edge 303c, and the sixth side edge 303d is connected to the seventh side edge 304c. The first bottom edge 301b is connected to the first base edge 305a, the second bottom edge 302b is connected to the second base edge 305b, the third bottom edge 303b is connected to the third base edge 305c, and the fourth bottom edge 304b is connected to the fourth base edge 305d.

Together, the first, second, third, and fourth sidewalls 301,302,303,304 and the base wall 305 form a water-tight, cup-like reservoir body 3 having the top opening 311 on a top side. In an embodiment, the first and third sidewalls 301,303 are approximately equal in length and width, and extend parallel to each other. In another embodiment, the second and fourth sidewalls 302,304 are approximately equal in length and width, and extend parallel to each other. The first and third sidewalls 301,303 extend perpendicular to the second and fourth sidewalls 302,304. A fluid receiving cavity 312 is disposed in the interior of the reservoir body 300.

A distance between an outer surface of the first and third sidewalls 301,303 is less than a diameter of the interior receiving cavity of the aeroponic growing column 1 described above. A distance between an outer surface of the second and fourth sidewalls 302,304 is less than the diameter of the interior receiving cavity of the aeroponic growing column 1 described above.

In another embodiment (not shown), the reservoir body 300 includes a circular sidewall, and the base wall 305. The base wall 305 is connected continuously to a bottom edge of the circular sidewall to form a water tight, cylindrical, cup-like structure having the fluid receiving cavity 312 disposed in the interior of the reservoir body 300. A diameter measured from an outer surface to an outer surface of the circular sidewall is less than the diameter of the interior receiving cavity of the aeroponic growing column 1 described above.

In an embodiment shown in FIGS. 12 and 13, the base wall 305 is concave and extends into the fluid receiving cavity 312. In one embodiment, the base wall 305 has a concave, cone-like shape. In the embodiment shown in FIG. 12, the base wall 305 has four triangular elements extending inward into the fluid receiving cavity 312, where each triangular element sits on a plane that extends obliquely from a plane formed by the first, second, third, and fourth bottom edges 301b,302b,303b,304b. In another embodiment, the base wall 305 is flat.

The plurality of fluid dispersing passageways 306 are positioned in the first, second, third, and fourth sidewalls 301,302,303,304, proximate to the base wall 305. The fluid dispersing passageways 306 extend from the interior of the controlled flow reservoir 3 to the exterior to for a through-hole. The shape of the fluid dispersing passageways 306 can be circular, square, oval, rectangular, hexagonal, triangular, or any other shape that allows the nutrient enriched fluid 160 in the controlled flow reservoir 3 to drain. The diameter of the fluid dispersing passageways 306 can be increased or decreased to increase or decrease the rate of nutrient enriched fluid 160 flow out of the controlled flow reservoir 3. In the embodiments where the base wall 305 is concave, an inner surface of the base wall 305 slopes towards the plurality of fluid dispersing passageways 306 to drain the nutrient enriched fluid 160 towards the fluid dispersing passageways 306.

The flange 310 is positioned along the top edges 301a, 302a303a,304a of the sidewalls 301,302,303,304 or along the single sidewall of the circular sidewall. The diameter of an outer circumferential edge 310a of the flange 310 is equal to a diameter of the fluid receiving end 11 of the first body 10 for the aeroponic growing column 1 described above.

To install the controlled flow reservoir 3 on the aeroponic growing column 1, the controlled flow reservoir 3 is positioned on the fluid receiving end 11 of the first body 10 such that the reservoir body 3 extends into the interior receiving cavity of the first body 10. The flange 310 rests on the fluid receiving end 11 and the outer circumferential edge 310a is flush with an outer surface of the first body 10. The fluid receiving cap 20 is then positioned on the fluid receiving end 11.

In an embodiment, the controlled flow reservoir 3 is incorporated into the aeroponic growing column system 100 described above when a plurality of aeroponic growing columns 1 are used. In this embodiment, the plurality of sprayers 150 are replaced with a plurality of float valves 151 connected to the supply conduit 111. The float valves 151 are positioned in the sprayer receiving holes 22 and extend into the fluid receiving cavities 312 of the controlled flow reservoirs 3. As the pump 113 pushes the nutrient enriched fluid 160 through the supply conduit 111 from the reservoir 110, the float valves 151 disperse the nutrient enriched fluid 160 into the fluid receiving cavity 312 at a rate that is greater than the rate that the nutrient enriched fluid 160 flows out of the fluid dispersing passageways 306. The level of the nutrient enriched fluid 160 in the fluid receiving cavities 312 will then rise towards the float valve 151. When the level of the nutrient enriched fluid 160 reaches a float in the float valve 151, the float will rise along with the level of the nutrient enriched fluid 160 until a preset level is reached. The float valve 151 will then shut off the flow of the nutrient enriched fluid 160 into the fluid receiving cavity 312 until the level drops below a predetermined threshold level, at which time the float valve 141 will then open to allow the nutrient enriched fluid 160 to again fill the fluid receiving cavity. By regulating the flow and quantity of nutrient enriched fluid 160 within each column 1, the pressure in the supply conduit 111 is increased, allowing greater flow to reach subsequent columns 1 positioned further along the supply conduit 111.

Figure 10:
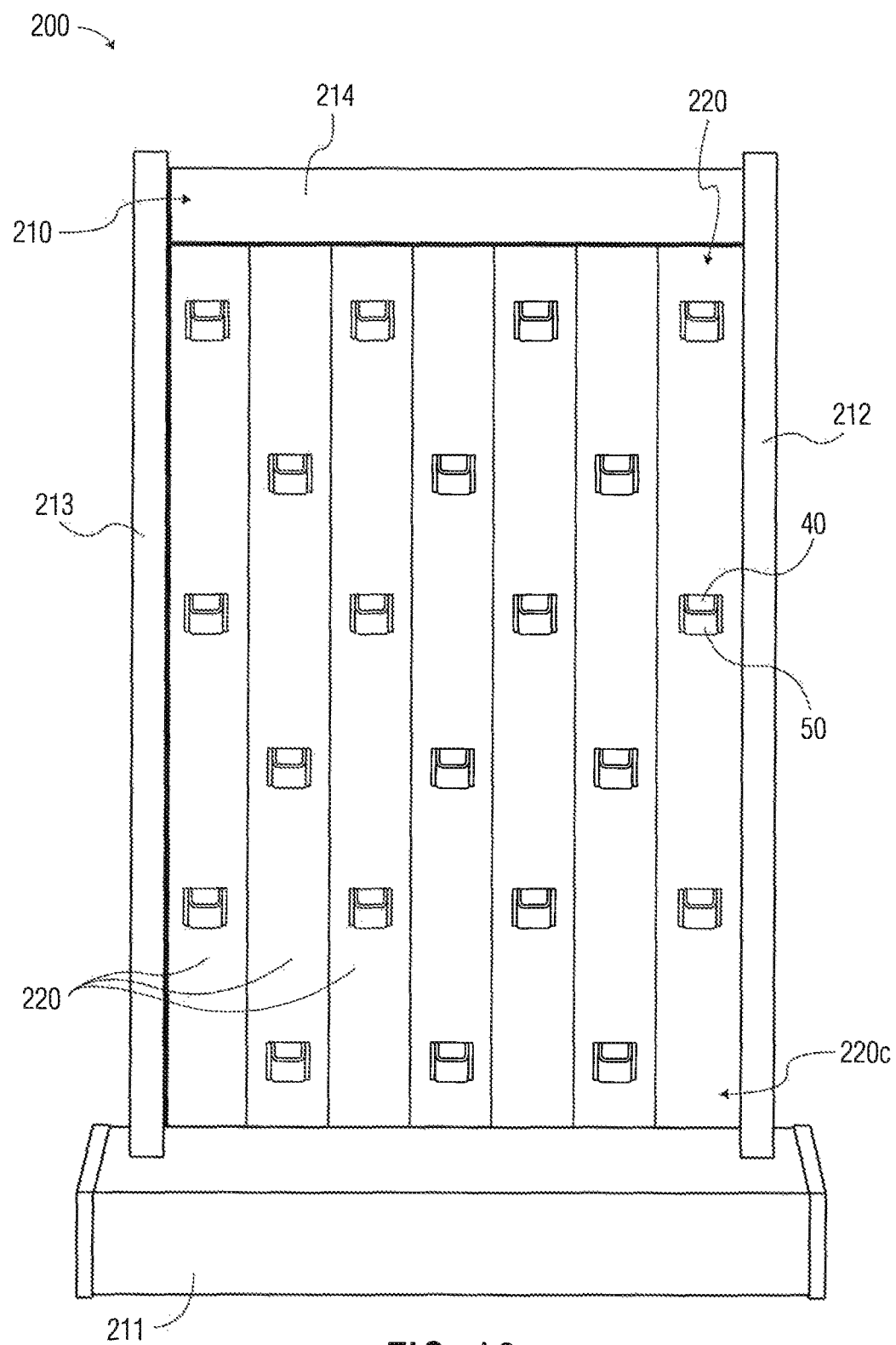
FIG. 10 is a plan view of an aeroponic growing wall system.
Figure 11:
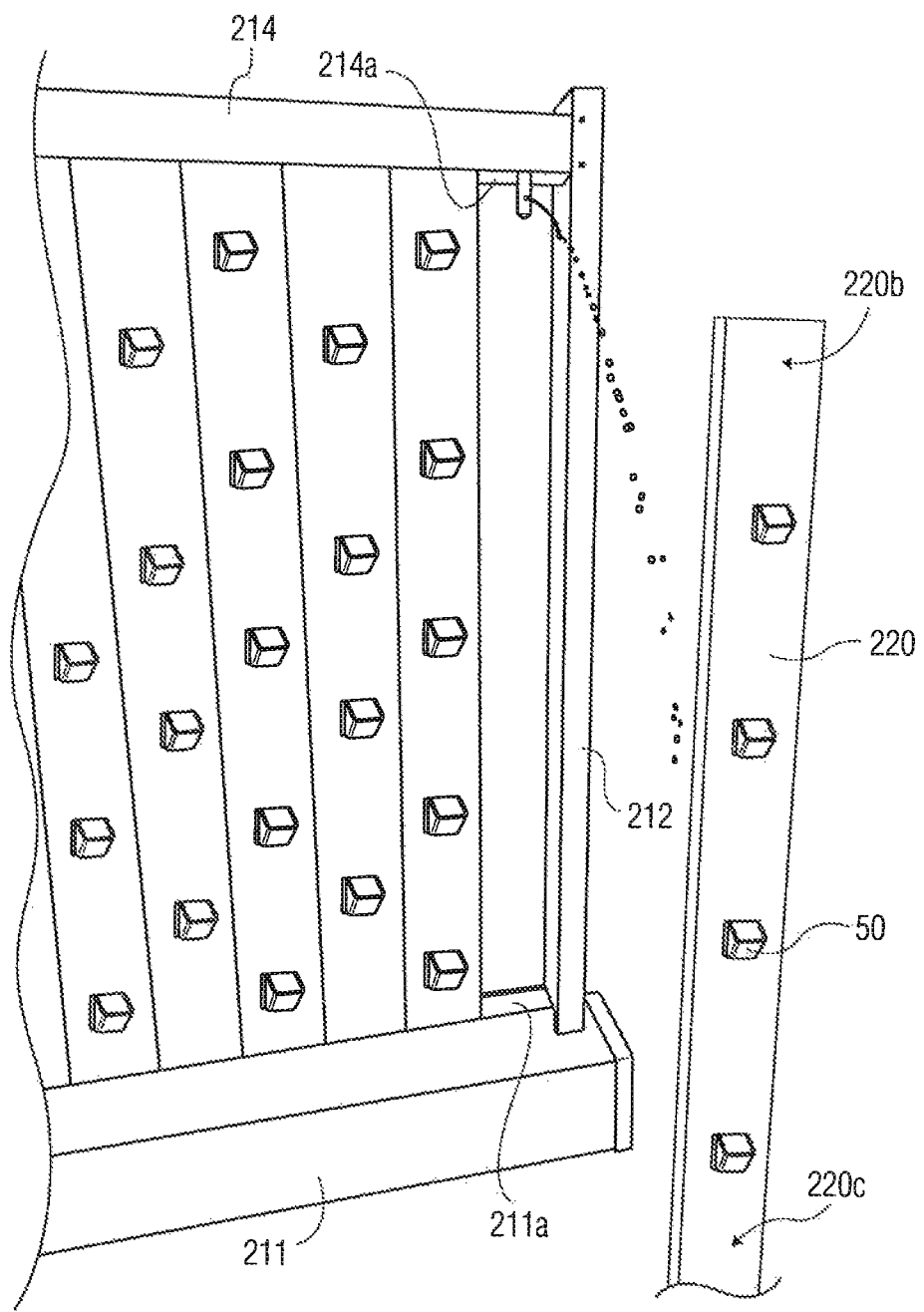
FIG. 11 is a partially exploded view of FIG. 10.

An embodiment of an aeroponic growing wall system 200 is disclosed in FIGS. 10 and 11 having a frame 210, a plurality of vertical growth columns 220, a supply conduit 230, the plurality of sprayers 150, the pump 113, and the nutrient enriched fluid 160.

The frame 210 includes a reservoir base 211, a first frame 212, a second frame 213, and a crossmember 214. The reservoir base 211 is elongated with a first end and an opposing second end and has a U-shaped fluid draining groove 211a extending between the first end and second end. One or more through-holes (not shown) are positioned within the trough of the fluid draining groove 211a, to allow any nutrient enriched fluid 160 in the fluid draining groove 211a to drain into the reservoir base 211. The reservoir base 211 holds the nutrient enriched fluid 160, discussed in the embodiments above.

The first frame 212 extends vertically from the first end of the reservoir base 211, and the second frame 213 extends vertically from the second end of the reservoir base 211, parallel to the first frame member 212. In an embodiment, both the first frame 212 and/or the second frame 213 are hollow and have an interior receiving cavity (not shown). The first and second frames 212,213 may be rectangular, square, round, oval, or any other shape.

As shown in FIG. 10, the crossmember 214 extends horizontally between the first frame 212 and the second frame 213 and is connected at each end thereto. As shown in FIG. 11, the crossmember 214 has a U-shaped groove 214a open towards the reservoir base.

In an embodiment shown in FIGS. 10 and 11, each column 220 has a hollow interior receiving space 220a, a top end 220b, a base end 220c, and the plurality of growing receptacle receiving openings 40.

As shown in FIG. 10, the plurality of vertical growth columns 220 are positioned adjacent to each other to form a wall. A portion of the top end 220b of each column 220 is positioned within the U-shaped groove 214a of the crossmember 214, and a portion of the base end 220c is positioned in the fluid draining groove 211a of the reservoir base 211. The weight of the columns 220 is supported by the reservoir base 211.

Similar to the embodiments described above for the column 1, the plurality of growing receptacle receiving openings 40 are disposed on an exterior surface of the columns 220. Also similar to the embodiments described above for the column 1, the plurality of growing receptacles 50 are positioned over the growing receptacle receiving holes 40, and have the same embodiments previously discussed.

The supply conduit 230 may be a pipe, rigid or flexible tubing, or any other conduit know to those of ordinary skill in the art. In an embodiment, the supply conduit 230 extends vertically out from a first or second end of the reservoir base 211, through the interior receiving cavity of the first frame 212 or the second frame 213, and then bends horizontally to extend into the U-shaped groove 214a of the crossmember 214.

The plurality of sprayers 150 are connected to a portion of the supply conduit 230 positioned in the U-shaped groove 214a of the crossmember 214. Each sprayer extends out of the crossmember 214 at a distance, towards the reservoir base 211. When the columns 220 are positioned in the frame 210, each sprayer 150 extends through the top end 220b of each column 220, and into the interior receiving space 220a.

The pump 113 positioned in the reservoir base 211 and is connected to the supply conduit 230. The pump 113 supplies the nutrient enriched fluid 160 from the reservoir base 110 to the plurality of sprayers 150 through the supply conduit 230. In an embodiment, a filter (not shown) can be positioned on the supply conduit 230 or to an inlet of the pump 113, between the reservoir base 211 and the sprayers 150 to remove impurities from the nutrient enriched fluid 160. A power supply (not shown) is connected to the pump 113. In other embodiments, the pump 113 may be positioned outside the reservoir base 211, and be in fluid communication with the reservoir base 211 and the supply conduit 230 to supply the nutrient enriched fluid 160 to the sprayers 150.

In the above described embodiments, the vertical growth columns 220 are removably positioned within the frame 210, similar to the columns 1 disclosed in the embodiments above. Since the weight of the columns 220 is supported by the reservoir base 211, the columns 220 can easily be removed or installed into the aeroponic growing wall system 200. To install a column 220, the top end 220b of the column 220 is first tilted at an angle towards the sprayer 150. The sprayer 150 is then inserted into the hollow interior receiving space 220a, and the top end 220b is positioned within the U-shaped groove 214a of the crossmember 214. Next, the column 220 is brought into a vertical position and the base end 220c is positioned over the fluid draining groove 211a of the reservoir base 211. The column 220 is then lowered such that the base end 220c is inserted into the fluid draining groove 211a until the weight of column 220 is supported by the reservoir base 211. To remove the column 220, the process is repeated in reverse.

The method of operation for the aeroponic growing wall system 200 is as follows. The pump 113 pushes the nutrient enriched fluid 160 through the supply conduit 230 from the reservoir base 211, upwards to the plurality of sprayers 150. The sprayers 150 then disperse the nutrient enriched fluid 160 into the interior receiving cavity of each vertical growth column 220 as a mist, fog, or spray. The nutrient enriched fluid 160 then travels down the length of each vertical growth column 220, from the top end 220b to the base end 220c through the use of gravitational pull. Excess nutrient enriched fluid 160 not used by the growing plants then drains from the base ends 220c of the columns 220 into the U-shaped fluid draining groove 211a of the reservoir base 211, and ultimately back into the reservoir base 211 through the through-holes to be reused.

What is claimed is:

1. A modular aeroponic growing column, comprising:
   an elongated first body having:
      a fluid receiving end,
      an opposite fluid draining end,
      an interior receiving space extending between the fluid receiving end and the fluid draining end, and
      a plurality of growing receptacle receiving openings positioned on the first body;
   a fluid receiving cap;
   a fluid draining base cap;
   a plurality of growing receptacles positioned in the growing receptacle receiving openings; and
   a controlled flow reservoir positioned in the interior receiving space on the fluid receiving end of the first body, the controlled flow reservoir includes a fluid receiving reservoir body and a plurality of fluid dispersing passageways, the fluid receiving reservoir body has a plurality of sidewalls extending from a base wall, the base wall having a concave shape, each of the fluid dispersing passageways are through-holes positioned only in the sidewalls of the fluid receiving reservoir body.

2. The modular aeroponic growing column of claim 1, wherein the first body is cylindrical, square, or rectangular.

3. The modular aeroponic growing column of claim 1, wherein the first body is square.

4. The modular aeroponic growing column of claim 1, wherein the fluid receiving cap is positioned on the fluid receiving end of the first body.

5. The modular aeroponic growing column of claim 4, wherein the fluid receiving cap has a fluid inlet receiving hole.

6. The modular aeroponic growing column of claim 1, wherein the fluid draining base cap is positioned on the fluid draining end of the first body.

7. The modular aeroponic growing column of claim 6, wherein the fluid draining base cap includes:
   a centrally positioned fluid outlet hole; and
   a drain spout connected to the fluid outlet hole and extending outward from the fluid draining end.

8. The modular aeroponic growing column of claim 1, wherein the growing receptacle receiving openings are through-holes extending through the first body into the interior receiving space.

9. The modular aeroponic growing column of claim 8, wherein one of the growing receptacles is positioned in each growing receptacle receiving opening.

10. The modular aeroponic growing column of claim 9, wherein each growing receptacle includes:
    a rear opening;
    a top opening;
    a front wall; and
    a pair of opposing sidewalls connected to opposite edges of the front wall.

11. The modular aeroponic growing column of claim 10, wherein the front wall has a first end in contact with the first body, and an opposite second end that extends orthogonally away from the first body.

12. The modular aeroponic growing column of claim 11, wherein:
    the first end of the front wall and two first edges of the pair of opposing sidewalls collectively define the rear opening; and
    the second end of the front wall and two second edges of the pair of opposing sidewalls collectively define the top opening.

13. The modular aeroponic growing column of claim 10, wherein each growing receptacle includes a latching mechanism with a first latching protrusion positioned on a first side of the rear opening and a second latching protrusion positioned on a second side of the rear opening.

14. The modular aeroponic growing column of claim 13, wherein each growing receptacle is removably affixed to the first body by engagement of the first latching protrusion and the second latching protrusion with a portion of the first body disposed about the growing receptacle.

15. A modular aeroponic growing column system, comprising:
    a fluid reservoir having:
       a supply conduit, and
       a return conduit;
    one or more removable growing columns having:
       an elongated first body with
          a fluid receiving end,
          an opposite fluid draining end,
          an interior receiving space extending between the fluid receiving end and the fluid draining end, and
          a plurality of growing receptacle receiving openings positioned on the first body,
       a fluid receiving cap positioned on the fluid receiving end and disengageably connected to the supply conduit,
       a fluid draining base cap positioned on the fluid draining end and disengageably connected to the return conduit,
       a plurality of growing receptacles positioned in the growing receptacle receiving openings; and
       a controlled flow reservoir positioned in the interior receiving space on the fluid receiving end of the first body, the controlled flow reservoir includes a fluid receiving reservoir body and a plurality of fluid dispersing passageways, the fluid receiving reservoir body has a plurality of sidewalls extending from a base wall, the base wall having a concave shape, each of the fluid dispersing passageways are through-holes positioned only in the sidewalls of the fluid receiving reservoir body.

16. The modular aeroponic growing column system of claim 15, further comprising a pump connected to the supply conduit.

17. The modular aeroponic growing column system of claim 15, further comprising a fluid sprayer connected to a terminating end of the supply conduit.

18. The modular aeroponic growing column system of claim 17, wherein the fluid sprayer is positioned in a fluid sprayer receiving passageway disposed in the fluid receiving cap.

19. The modular aeroponic growing column system of claim 18, wherein the fluid draining base cap further includes a drain spout extending outward from the fluid draining end and terminating in the return conduit.

20. The modular aeroponic growing column system of claim 19, wherein when the growing column is in a vertical position, the fluid draining base cap rests on a fluid draining base connected to the return conduit.

21. The modular aeroponic growing column system of claim 20, wherein the elongated first body is removably held in the vertical position by the fluid sprayer positioned in the fluid sprayer receiving passageway and the fluid draining base cap resting on the fluid draining base.

22. The modular aeroponic growing column system of claim 15, further comprising a nutrient enriched fluid.

23. The modular aeroponic growing column system of claim 22, further comprising an analysis instrument that measures a temperature, a conductivity, a pH, or a combination thereof, of the nutrient enriched fluid.

24. The modular aeroponic growing column system of claim 23, further comprising a nutrient injector electrically connected to the analysis instrument and mechanically connected to the fluid reservoir.

25. A modular aeroponic growing column, comprising:
an elongated first body having:
  a fluid receiving end,
  an opposite fluid draining end,
  an interior receiving space extending between the fluid receiving end and the fluid draining end, and
  a plurality of growing receptacle receiving openings positioned on the first body, the growing receptacle receiving openings are through-holes extending through the first body into the interior receiving space;
a fluid receiving cap;
a fluid draining base cap;
a plurality of growing receptacles positioned in the growing receptacle receiving openings, one of the growing receptacles is positioned in each growing receptacle receiving opening, each growing receptacle includes a rear opening, a top opening, a front wall, a pair of opposing sidewalls connected to opposite edges of the front wall, and a latching mechanism with a first latching protrusion positioned on a first side of the rear opening and a second latching protrusion positioned on a second side of the rear opening; and
a controlled flow reservoir positioned in the interior receiving space on the fluid receiving end of the first body.

26. The modular aeroponic growing column of claim 25, wherein each growing receptacle is removably affixed to the first body by engagement of the first latching protrusion and the second latching protrusion with a portion of the first body disposed about the growing receptacle.

* * * * *